United States Patent
Bartley-Cho et al.

(10) Patent No.: US 7,291,373 B2
(45) Date of Patent: Nov. 6, 2007

(54) THERMALLY INSULATED STRUCTURE—FULL DEPTH SANDWICH JOINT CONCEPT

(75) Inventors: Jonathan D. Bartley-Cho, Arcadia, CA (US); Christopher M. Yasaki, Torrance, CA (US); F. Donald Pousha, Brea, CA (US); Ross S. Reynolds, La Habra, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 208 days.

(21) Appl. No.: 11/122,468

(22) Filed: May 5, 2005

(65) Prior Publication Data

US 2006/0248853 A1 Nov. 9, 2006

(51) Int. Cl.
*B32B 3/10* (2006.01)
*B64C 1/40* (2006.01)

(52) U.S. Cl. .............. 428/61; 428/117; 428/119; 428/223; 244/131; 244/133

(58) Field of Classification Search ............ 428/73, 428/117, 118, 119, 223, 61; 52/783.1, 793.1, 52/800.1, 801.1, 801.11; 244/131, 133, 123.13, 244/123.6, 119
See application file for complete search history.

(56) References Cited

U.S. PATENT DOCUMENTS

| | | | |
|---|---|---|---|
| 3,137,887 A | * | 6/1964 | Mannino et al. ............ 16/2.1 |
| 3,977,146 A | * | 8/1976 | Wiley ....................... 52/787.1 |
| 4,206,895 A | * | 6/1980 | Olez ........................ 244/123.3 |
| 4,564,547 A | * | 1/1986 | Hughes ...................... 428/117 |
| 4,579,475 A | | 4/1986 | Hart-Smith et al. |
| 4,793,727 A | | 12/1988 | Schmaling |
| 5,445,861 A | | 8/1995 | Newton et al. |
| 6,668,515 B2 | | 12/2003 | Bertin |
| 6,782,672 B2 | | 8/2004 | Staats |
| 6,823,918 B2 | | 11/2004 | Grosskrueger et al. |

\* cited by examiner

*Primary Examiner*—Alexander Thomas

(57) ABSTRACT

Provided is a composite joint comprising a pair of composite panels each defining a composite panel thickness and having an inner face sheet and an outer face sheet sandwiching a core panel therebetween. The core panel defines a constant thickness portion and a ramp portion along which the core panel tapers to a reduced thickness portion. The outer face sheet is thickened in the area of the reduced thickness portion. The core panel includes a plurality of cells extending between the inner and outer face sheets. The cells within the reduced thickness portions are filled with a filler material. The cells within the ramp portions and constant thickness portions are filled with aerogel. A primary splice plate extends across the reduced thickness portions. Mechanical fasteners extend through the outer face sheet and into the primary and secondary splice plates. A themal barrier compound covers the primary splice plate.

20 Claims, 2 Drawing Sheets

THERMALLY INSULATED STRUCTURE—FULL DEPTH SANDWICH JOINT CONCEPT

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

The present invention relates generally to structural joints in composite structures and, more particularly, to a uniquely configured composite joint that is specifically adapted to minimize transfer of heat across the composite joint such as between an exterior of the composite structure and an interior thereof. The unique arrangement of the composite joint also provides for an effective sealing of the interior of the composite structure such as may be required in a fuel tank of an aircraft.

In many vehicles such as aircraft, the control of heat flow through certain structural areas is of critical importance in the design of the aircraft. More specifically, certain aircraft constructed of composite materials must be adapted to limit the flow of heat from an exterior of the aircraft to an interior thereof. Likewise, it is sometimes desirable to limit the flow of heat across a composite joint out of an interior portion of a composite structure. As is well known in the art, composite structures are typically comprised of composite panels which are constructed as inner and outer face sheet within which a core panel is sandwiched therebetween.

The composite face sheets may be fabricated of any fiber reinforced resin matrix such as fiberglass or graphite epoxy. Core panel materials are typically foam or honeycomb construction. It is also well known that many aircraft integrate fuel tanks into the wing structure. The ability to control or prevent the flow of excess heat into the fuel tanks is important for the overall integrity, performance and safety of the aircraft. Such heat may be generated due to aerodynamic friction as well as due to radiation as may be generated by the sunlight on the aircraft's wing surfaces.

Heat generated by aerodynamic friction on outer surfaces of joint areas of the aircraft may be somewhat mitigated by the use of countersunk fasteners. More specifically, it is common in the industry to employ mechanical fasteners having countersunk heads in joint areas to minimize the amount of aerodynamic drag that would otherwise be collected by protruding fastener heads. However, because most mechanical fasteners include a shank which extends from the exterior to the interior of the aircraft structure, the mechanical fastener provides a path by which thermal heat may readily pass into the interior.

The control of heat flow through non-joint areas of the composite structures may be more easily controlled. For example, thermal conductivity from the outer face sheet toward the inner face sheet may be controlled by reducing the radiative or conductive heat transfer through the core panel. For core panels made of closed cell foams, conductive heat transfer is made difficult due to the large number of small cells that the heat must cross in traveling from one face sheet to another face sheet, such as from an outer face sheet to an inner face sheet. For honeycomb core panels, both radiative and conductive heat transfer between the outer face sheet and the inner face sheet is much easier as most honeycomb cores include hollow cells which provide a direct path for heat flow. Moreover, cell walls of honeycomb core panels provide a direct conductive heat path from the outer face sheet to the inner face sheet.

Control of heat flow in joint areas is more difficult due to the heat path provided by mechanical fasteners. In such joint areas, heat conduction from the outer surface to the inner surface is a function of the cross sectional area of the shank of the mechanical fasteners. Unfortunately, because most mechanical fasteners are typically formed of highly conductive materials such as metallic material, heat is easily conducted through the shank. One attempt to minimize the amount of heat that transfers through the shanks of mechanical fasteners is to minimize the quantity of fasteners that are utilized in joint areas. Unfortunately, a certain amount of fasteners are required in order to adequately transfer structural loads.

Furthermore, many aircraft typically include removable access panels or doors which allow for inspection and or access to certain internal portions of the aircraft structure. For example, fuel tanks in some aircraft may include removable panels that to allow for inspection of interior portions of the fuel tank. For such access panels, a plurality of mechanical fasteners are typically provided around the perimeter of the access panel. Unfortunately, heat is easily conducted through the shanks of such mechanical fasteners. The control of such heat flow to the fuel tank is of critical importance.

As can be seen, there exists a need in the art for a composite joint wherein the conduction of heat through the shank of the mechanical fasteners to the interior of the structure is minimized. Furthermore, there exists a need in the art for a composite joint that allows for effective sealing in the interior of the composite joint such that fluids may be effectively contained. In addition, there exists a need in the art for a composite joint that provides for effective sealing under dynamic structural loading of the composite joint such as may be caused by aerodynamic forces. Finally, there exists a need in the art for a composite joint that is of simple construction in order to simplify manufacturability, installation and maintenance.

BRIEF SUMMARY OF THE INVENTION

The present invention specifically addresses the above-referenced needs associated with composite joints. More specifically, the present invention is a composite joint which minimizes heat conduction between an exterior and an interior of the composite joint. In this regard, the composite joint of the present invention may be configured to limit heat conduction in a specified direction across the composite joint. For example, the composite joint may be configured to limit heat conduction in a direction from the interior to the exterior of the composite joint such as may be desirable, for example, in retaining heat within a hot water tank located within a wing structure. Likewise, the composite joint may be configured to limit heat conduction along a direction from external wing surfaces to the interior of the composite joint such as may be desirable, for example, in preventing heat buildup in a fuel tank located in the wing structure.

The present invention may be configured as a composite joint and/or as a composite structure. The composite joint comprises a pair of adjoining composite panels and a primary splice plate. The primary splice plate is configured to connect the composite panels using at least one mechanical fastener extending through each of the composite panels and through the primary splice plate. Importantly, the composite joint includes a layer of thermal barrier compound covering the primary splice plate. The thermal barrier compound may also extend beyond the primary splice plate and may partially overlap the inner face sheets of the adjoining composite panels.

The present invention may further be configured as the composite structure wherein a continuous, uninterrupted section of a composite panel is included and which may itself include a constant thickness portion that transitions along ramp portions to a reduced thickness portion. A vertical web may be extended laterally inwardly from the reduced thickness portion for load distribution purposes and/or for partitioning an internal area. For purposes of the following discussion, the arrangement of the composite structure of the present invention is substantially similar to the arrangement of the composite joint of the present invention with the main difference being that the composite joint includes two adjoining composite panels whereas the composite structure includes a single one of the composite panels.

In the composite joint, each of the composite panels includes opposing inner and outer face sheets sandwiching a core panel therebetween. The inner and outer face sheets may be constructed of a fiber reinforced matrix material such as fiberglass or graphite epoxy although any suitable material may be used. The core panel may be constructed of honeycomb material which typically has a plurality of aligned hexagonally cross-sectional shaped cells that extend from the inner face sheet to the outer face sheet. The honeycomb may be formed of aramid paper so as to have a reduced heat conducting capability although any material may be used.

The core panel defines a generally constant thickness portion and a ramp portion along which the core panel tapers to a reduced thickness portion. The outer face sheets of the adjoining composite panels are locally thickened in the area of the core panel reduced thickness portion such that the overall thickness of the composite panel is substantially maintained therethroughout.

The cells within the reduced thickness portions are filled with a filler material. The cells within the ramp portions and within the constant thickness portions are preferably filled with aerogel in order to reduce the amount of heat flux across the composite joint. The filler material may be an aerogel and/or thermal barrier compound and/or potting compound.

The composite joint includes a primary splice plate which extends across the reduced thickness portions of the adjoining composite panels and may further include at least one secondary splice plate which is preferably sized and configured to be complimentary to the primary splice plate. The primary splice plate is sandwiched between the inner face sheets and a secondary splice plate.

At least one mechanical fastener extends through the outer face sheet at its locally thickened area and into the reduced thickness portions of the core panel and passes through the inner face sheet before entering the primary and secondary splice plates. The mechanical fasteners terminate in a fastener receiver disposed against the secondary splice plate.

A layer of thermal barrier compound preferably covers the primary splice plate as well as the fastener receivers and also preferably extends beyond the primary splice plate and downwardly along edges thereof to the inner face sheets of the composite panel. The thermal barrier compound may be installed as a paste or as preformed blocks so as to provide any thickness of thermal barrier compound.

A coating of polysulfide sealant may be distributed along the inner face sheets and along the thermal barrier compound covering the primary splice plate and fastener receivers. In this regard, a polysulfide sealant is a final coating which is applied after the application of the thermal barrier coating thereon. Such polysulfide sealant may provide a means for fluid sealant of the composite joint as well as provide an additional layer of insulated material.

BRIEF DESCRIPTION OF THE DRAWINGS

These as well as other features of the present invention will become more apparent upon reference to the drawings wherein.

DETAILED DESCRIPTION OF THE INVENTION

Figure 1:
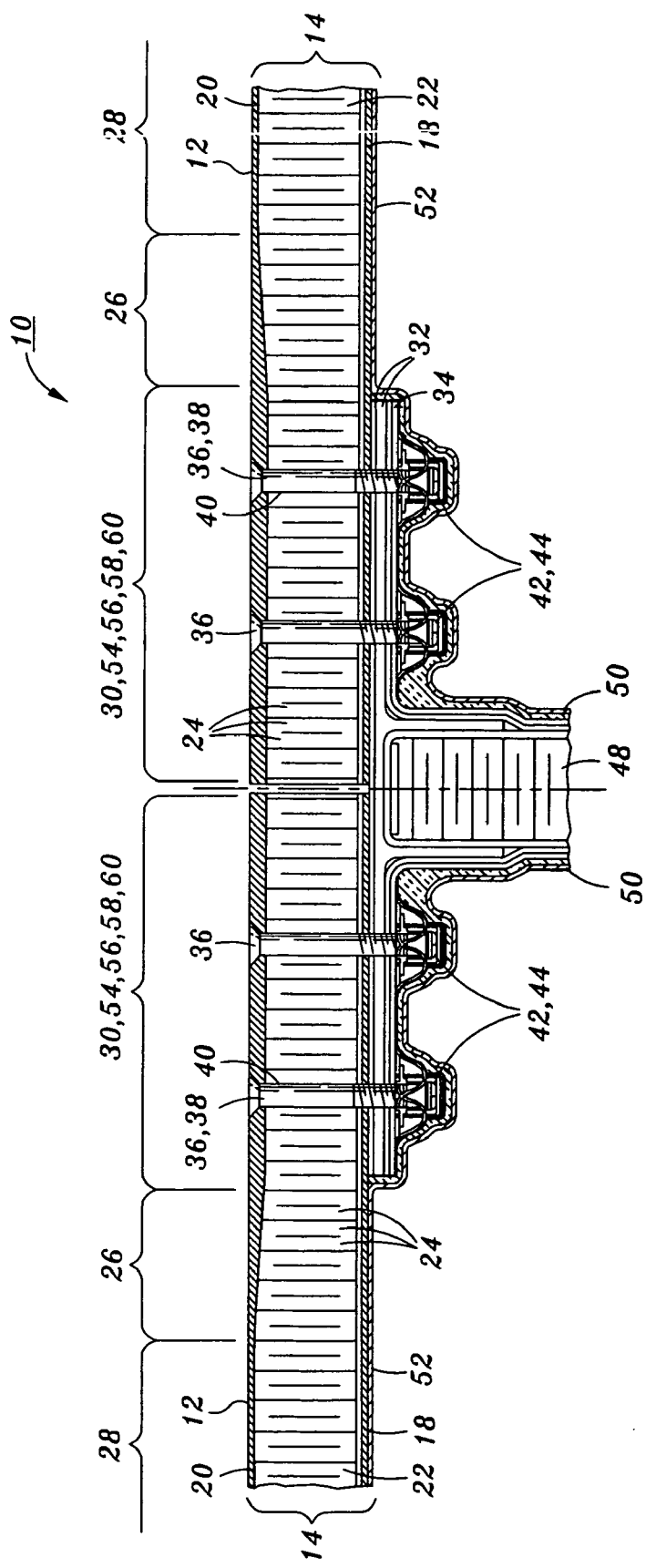
FIG. 1 is a cross-sectional view of a composite joint of the present invention illustrating a pair of adjoining composite panels interconnected by a primary splice plate and further illustrating a first configuration for a layer of thermal barrier compound on a left side of the composite joint and a second configuration for the layer of thermal barrier compound on a right side of the composite joint.

Referring now to the drawings wherein the showings are for purposes of illustrating the present invention and not for purposes of limiting the same, provided is a composite joint 10 that is uniquely configured for minimizing heat conduction through mechanical fasteners 36 which interconnect the composite panels 12. The composite joint 10 is specifically configured to prevent heat transfer across the composite joint 10.

Figure 1A:
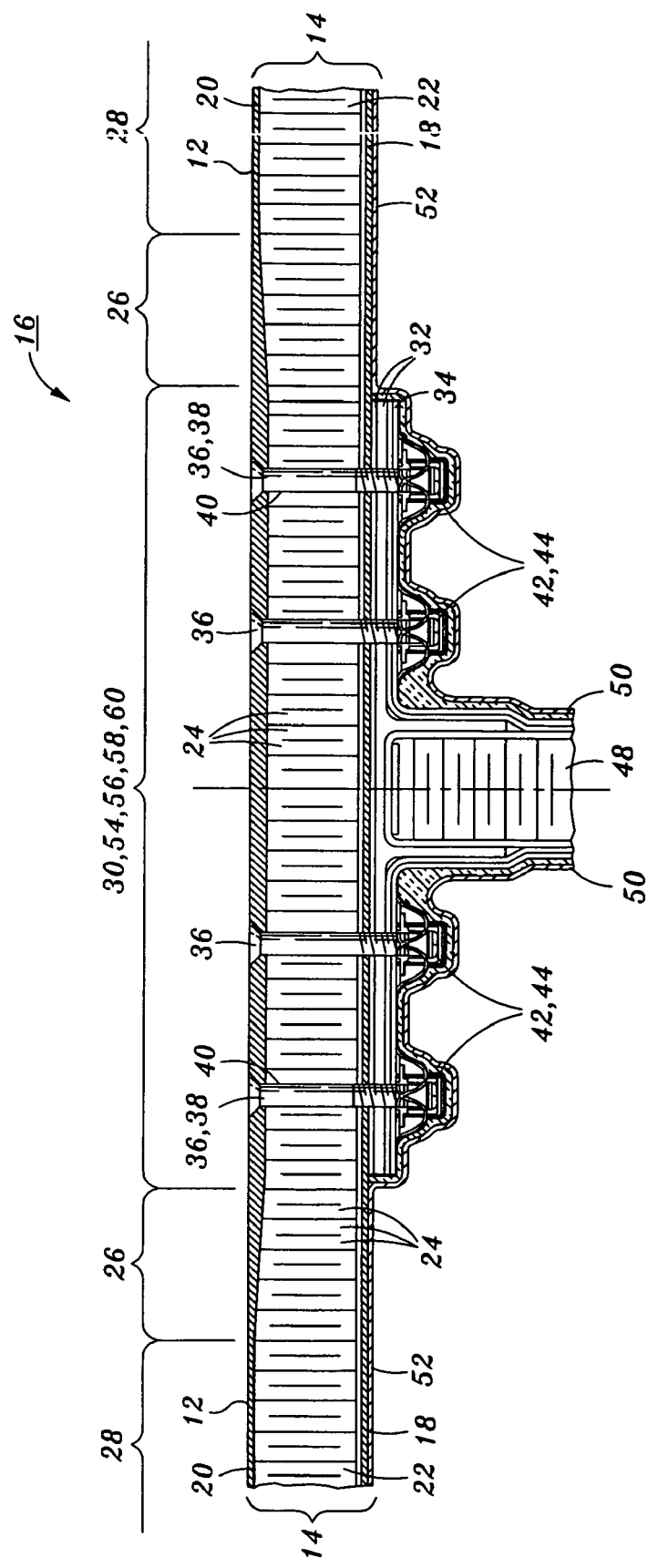
FIG. 1a is a cross sectional view of a composite structure in a further embodiment of the present invention and illustrating a composite panel interconnected to a vertical web and having mechanical fasteners extending through a primary splice plate with a layer of thermal barrier compound disposed thereon.

It should be noted that the present invention may be configured as a composite joint 10 as shown in FIG. 1 or as a composite structure 16 as shown in FIG. 1a. The composite joint 10 shown in FIG. 1 comprises a pair of adjoining composite panels 12 and a primary splice plate 32. In its broadest sense, the composite joint 10 comprises the pair of adjoining composites panels, a primary splice plate 32, and at least one mechanical fastener 36 extending through each one of the composite panels 12 with a layer of thermal barrier compound 56 covering the primary splice plate 32

The present invention may further be configured as the composite structure 16 shown in FIG. 1a wherein a continuous, uninterrupted section of a composite panel 12 may include an area wherein the composite panel 12 includes a core panel 22 having a constant thickness portion 28 that tapers along a pair of ramp portions 26 to a reduced thickness portion 30. A vertical web 48 may be extended laterally inwardly from the inner face sheet 18 at the reduced thickness portion 30 for load distribution purposes and/or for partitioning an internal area. For purposes of the following discussion, the arrangement of the composite structure 16 of the present invention is substantially similar to the arrangement of the composite joint 10 of the present invention with the main difference being that the composite joint 10 includes two adjoining composite panels 12 whereas the composite structure 16 includes only a single one of the composite panels 12.

Referring first to FIG. 1, the composite joint 10 comprises the pair of adjoining composite panels 12 which are shown disposed in side-by-side arrangement and are generally aligned with one another. As is well known in the art of composite construction, each one of the composite panels 12 is comprised of an inner and outer face sheet 18, 20 with a core panel 22 sandwiched therebetween. The inner and outer face sheets 18, 20 are bonded to the core panel 22 and are typically constructed of a fiber reinforced matrix material such as fiberglass or graphite epoxy. However, the inner and outer face sheets 18, 20 may be constructed of any material and are not necessarily limited to a fiber reinforced resin material but may be fabricated of metallic material, a polymeric material or any other material suitable for the application. Furthermore, the inner and outer face sheets 18, 20 may be comprised of multiple layers of inner and outer face sheets 18, 20, respectively.

Referring still to FIG. 1, the core panel 22 of the present invention has a generally constant thickness portion 28 and a pair of ramp portions 26 along which the core panel 22 tapers to a reduced thickness portion 30 thereof. As can be seen in FIG. 1, the reduced thickness portions 30 are arranged to be in generally side-by-side arrangement with one another. In the present invention, the outer face sheets 20 of the adjoining composite panels 12 are locally thickened in the area of the core panel 22 of the reduced thickness portion 30. The outer face sheets 20 are thickened in this local area such that the overall composite panel thickness 14 is substantially maintained therethroughout.

The core panel 22 may be constructed of any material having suitable mechanical properties such as suitable strength and stiffness characteristics for the given application. For the composite joint 10 of the present invention, it is contemplated that the core panels 22 are constructed generally of honeycomb material which, as is well known in the art, typically comprises a sheet of material having a plurality of aligned cells 24 each having a hexagonal cross-sectional shape and which are generally elongate and hollow and generally extend from the inner face sheet 18 to the outer face sheet 20. Furthermore, the cells 24 of the honeycomb are typically oriented to be generally orthogonal relative to the inner and outer face sheets 18, 20 although other orientations are contemplated.

For the configuration of the present invention, it is contemplated that the honeycomb is formed of aramid paper so as to have a reduced heat conducting and capability. However, it is noted that the honeycomb may be formed of any material including metallic material and/or polymeric material. However, due to the relatively high heat conducting capability of metallic materials, aramid paper is preferred. The aramid paper may be an aramid fiber paper that is saturated with resin in order to produce a cell 24 structure having improved mechanical properties for the core panel 22. In addition, such aramid fiber paper advantageously provides reduced thermal conductivity properties which are more suitable for the present invention Importantly, the cells 24 within the reduced thickness portions 30 of the core panel 22 are substantially filled with a filler material 54. However, the cells 24 within the ramp portions 26 and within the constant thickness portions 28 of the core panel 22 are preferably substantially filled with aerogel 60. Filling the cells 24 with filler material 54 and/or aerogel 60 reduces the amount of heat flux across the composite joint 10 from the outer face sheets 20 to the inner face sheets 18.

For the reduced thickness portion 30 of the core panel 22, the filler material 54 may be one of an aerogel 60 and/or thermal barrier compound 56 and/or potting compound 58 or any combination thereof. Importantly, the filler material 54 prevents heat convection and radiation and reduces heat conduction between the outer face sheets 20 and the inner face sheets 18. In this manner, unwanted thermal buildup within the inner structure of the composite joint 10 is avoided.

The aerogel 60 which may be used in the cells 24 of the ramp portions 26 and constant thickness portions 28 is a well known material and is utilized frequently in the aerospace industry. Aerogel 60 is generally a highly porous material which may be comprised of silicon and/or metal oxides and which has an extremely low density but which also has an extremely high internal surface area. For this reason, aerogel 60 has an extremely high load carrying capability which makes it ideal as a lightweight structural material for composites. Advantageously, the extremely high internal surface area of aerogel 60 also makes it ideal as a thermal barrier material 56. As was earlier mentioned, the aerogel 60 as used in the present invention may be a silica aerogel 60 although other aerogels 60 such as metal oxide aerogel 60 may be used.

The filler material 54 may be a thermal barrier compound 56 and, in this regard, the thermal barrier compound 56 may be any compound having heat insulating characteristics. A preferred thermal barrier compound 56, however, is one that is commonly referred to as FASTBLOCK, manufactured by Kirkhill-TA Company, Brea, Calif. FASTBLOCK utilizes a silicon based elastomer which also contains ceramic precursors that transition into thermally resistant ceramic material when exposed to high heat.

Due to its composition, the FASTBLOCK provides a stiff, low density coating which, upon exposure to extreme temperatures, becomes ceramic in order to reduce heat transfer therethrough. The thermal barrier compound 56 may alternatively be comprised of any silicon based ablative material or any other material that prevents high heat flux. However, FASTBLOCK may be a preferred thermal barrier compound 56 and more particularly, FASTBLOCK-800F may be a most preferred alternative in the family of FASTBLOCK products due to its viscous consistency which may enhance its application into the composite joint 10.

Another preferred filler material 54 may be a potting compound 58 such as an epoxy microballoon matrix material. However, for the particular application described herein, it is contemplated that resin may be a better candidate for the potting compound 58. In this regard, thermoset bismaleimide resin (BMI) may be a preferred resin for the potting compound 58. Other materials from which the thermal barrier compound 56 may be comprised include Nanogel, TEEK foam, polyurethane foam, polyvinylchloride (PVC) foam and Rohacell foam.

Nanogel, manufactured by Nanogel-Cabot Corporation, Alpharetta, Ga., is a hydrophobic silica aerogel 60 which has nano-sized pores. Such fine pore structure of Nanogel provides superior thermal protection for the application described herein. TEEK Foam is a polyimide foam that is commercially known as SOLREX and is available from Sordal of Holland, Mich. TEEK Foam is a very low density, closed cell 24 which retains its structural integrity under extreme temperatures. Such TEEK Foam may be directly installed on a structural system or injected into the cells 24 of honeycomb core panel 22 in a timely and efficient manner.

Polyurethane foam may also be used for filling cells 24 of the honeycomb core panel 22. Likewise, Airex, a PVC foam manufactured by Alcan Baltek Corporation, Northyale, N.J. is a lightweight closed cell 24 foam that also offers excellent thermal resistance at elevated temperatures and which exhibits high stiffness and strength characteristics for its low weight. Rohacell is a polymethacrylimide foam that is a closed cell 24 rigid foam which exhibits favorable thermal resistance at elevated temperatures. Regardless of which type of filler material 54 is chosen to fill the cells 24 in the reduced thickness portions 30 of the core panels 22, the filler material 54 preferably has favorable thermal resistance properties which are maintainable at elevated temperatures.

The composite joint 10 of the present invention may further include the primary splice plate 32 which extends across the reduced thickness portions 30 of the adjoining composite panels 12. In this regard, it is contemplated that the primary splice plate 32 has a width which is approximately equivalent to that of the combined width of the reduced thickness portions 30 for the adjoining composite panels 12. By configuring the primary splice plate 32 with such equivalent width, it is contemplated that an appropriate surface area of the primary splice plate 32 is provided.

The composite joint 10 may further include at least one secondary splice plate 34 which is preferably sized and configured to be complimentary to the primary splice plate 32 as is shown in FIG. 1. However, the secondary splice plate 34 may be of any size and any shape. The primary splice plate 32 is preferably sandwiched between the inner face sheets 18 and the secondary splice plate 34. As is shown in the Figure, however, the secondary splice plate 34 may be comprised of a stack of secondary splice plates 34. In this regard, the inner ones of the secondary splice plates 34 are preferably sandwiched between a primary splice plate 32 and the outermost one of the secondary splice plates 34.

A plurality of primary splice plates 32 may also be provided wherein the primary splice plates 32 may have an increased thickness relative to a thickness of the secondary splice plates 34. The primary splice plates 32 and/or the secondary splice plates 34 may be provided in any width such as that which is described above wherein the primary splice plates 32 have a width which is approximately equivalent to the combined width of the reduced thickness portions 30 of the core panels 22. However, it is also contemplated that the primary splice plate 32 may extend into the constant thickness and/or ramp portions 26 of the core panels 22.

The composite joint 10 further includes at least one mechanical fastener 36 which extends through the outer face sheet 20 at its locally thickened area and into the reduced thickness portions 30 of the core panel 22 and passing through the inner face sheet 18 of each one of the adjoining composite panels 12 before entering the primary splice plate 32. If a secondary splice plate 34 or a plurality of secondary splice plates 34 are provided, it is further contemplated that the mechanical fastener 36 will extend therethrough. As shown in the Figure, the mechanical fasteners 36 may be arranged in two rows in each one of the composite panels 12. However, the mechanical fasteners 36 may be provided in any number of rows on each side of the composite panels 12. Furthermore, the mechanical fasteners 36 may be provided in any arrangement other than rows such as in a staggered arrangement.

As can be seen in the Figure, each one of the mechanical fasteners 36 terminates in a fastener receiver 42 which is preferably disposed against the secondary splice plate 34. In this regard, the fastener receiver 42 may be configured as a dome nut 44 such as a nut plate device which may be permanently affixed to the primary splice plate 32. The dome nut 44 may be configured to provide sealing of the shank 40 of the mechanical fastener 36 against the interior volume of the composite joint 10. More specifically, in scenarios wherein the interior of the composite joint 10 is a portion of a fuel tank integrated into a wing structure, the dome nut 44 may provide sealing against fluids so as to prevent leakage of the fluid through the fastener receiver 42 and out into the exterior of the fuel tank.

The mechanical fastener 36 may be configured as a screw or a bolt and is preferably installed countersunk into the outer face sheets 20 in order to minimize their dynamic friction which may increase heat transfer through the shank 40. In this regard, the fastener head 38 of the mechanical fasteners 36 may be countersunk into the outer face sheets 20. The composite joint 10 of the present invention may optionally include a vertical web 48 which extends laterally inwardly from the inner face sheet 18 of the adjoining composite panels 12 as is shown in the Figure. The vertical web 48 may include opposing web faces 50.

Further comprising the composite joint 10 is the layer of thermal barrier compound 56 which preferably covers the primary splice plate 32 as well as the fastener receivers 42 and which also preferably extends beyond the primary splice plate 32 and downwardly along edges thereof to the inner face sheets 18 of the composite panel 12. As in shown in FIG. 1, the thermal barrier compound 56 may be provided at a level which is slightly above the level of the fastener receivers 42 as is shown on the right hand side of the composite joint 10 in FIG. 1. Alternatively, the thermal barrier compound 56 may be provided in a relatively thin layer covering the primary splice plate 32 and the profile of the fastener receivers 42 as is shown on the left hand side of the composite joint 10 in FIG. 1. Furthermore, it is contemplated that the thermal barrier compound 56 may be extended along the opposing web faces 50 of the vertical web 48 so as to provide improved thermal resistance thereagainst.

It is contemplated that the thermal barrier compound 56 may be installed as a paste or as preformed blocks which are glued or otherwise adhered to the primary splice plate 32. If provided in paste form, it is contemplated that the thermal barrier compound 56 may be troweled onto the primary splice plate 32 and over the fastener receivers 42 at the desired thickness. Likewise, the paste of the thermal barrier compound 56 may be troweled along the web faces 50 of the vertical web 48 so as to provide a continuous layer of thermal barrier compound 56 between the primary splice plate 32 and the vertical web 48.

If provided as preformed blocks, it is contemplated that the thermal barrier compound 56 may be installed by adhering the preformed blocks to the primary splice plate 32 and/or the web faces 50. Likewise, preformed blocks of the thermal barrier compound 56 may be installed against the ramp portions 26. In this manner, the thermal barrier compound 56 may be provided in any thickness and may be installed in any manner so as to provide the requisite amount of thermal resistance to prevent conduction of heat into the interior of the composite joint 10.

The composite joint 10 of the present invention may further comprise a coating of polysulfide sealant 52 which may be extended or covered along the inner face sheets 18 and along a thermal barrier compound 56 covering the primary splice plate 32 and fastener receivers 42. In this regard, a polysulfide sealant 52 is a final coating which is applied after the application of the thermal barrier coating thereon. Such polysulfide sealant 52 may provide an additional layer of insulated material.

Preferably, polysulfide sealant 52 is installed in order to provide an additional sealant against leakage of fluid. For example, polysulfide sealants 52 are commonly used in fuel tank sealing applications. It is contemplated that a polysulfide compound may be provided which is including microballoon materials in order to reduce density thereof and reduce weight. However, it is contemplated that the composite joint 10 of the present invention may utilize any sealant which may provide the required fluid leakage prevention.

Referring briefly to FIG. 1a, as was earlier mentioned, the present invention may be configured as the composite structure 16 including a continuous, uninterrupted section of composite panel 12 is included and which may itself include a core panel 22 having a pair of constant thickness portions 28 that transitions along ramp portions 26 to a reduced thickness portion 30. As shown in FIG. 1a, the vertical web 48 may be extended laterally inwardly from the inner face sheet 18 at the reduced thickness portion 30. For purposes of the following discussion, the arrangement of the composite structure 16 of the present invention is substantially similar to the arrangement of the composite joint 10 of the present invention with the main difference being that the composite joint 10 includes two adjoining composite panels 12 whereas the composite structure 16 includes a single one of the composite panels 12.

Referring to FIG. 1a, the composite structure 16 includes the composite panel 12 which defines a composite panel thickness 14 and having at least one of the inner and outer face sheet 20 sandwiching the core panel 22 therebetween. The core panel 22 defines a pair of the generally constant thickness portions 28 and a pair of the ramp portions 26 along which the core panel 22 tapers to a reduced thickness portion 30. As can be seen in FIG. 1a, the outer face sheet 20 is locally thickened in the area of the core panel 22 reduced thickness portion 30 such that the composite panel thickness 14 is generally constant thereacross. As was earlier mentioned, the core panel 22 includes the plurality of cells 24 extending between the inner and outer face sheets 20. The cells 24 within the reduced thickness portion 30 are substantially filled with the filler material 54 while the cells 24 within the ramp portions 26 and the constant thickness portions 28 are substantially filled with aerogel 60.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A composite structure, comprising:
   a composite panel defining a composite panel thickness and having at least one of an inner and outer face sheet sandwiching a core panel therebetween, the inner and outer face sheets being formed of non-metallic material, the core panel defining a generally constant thickness portion and a ramp portion along which the core panel tapers to a reduced thickness portion, the outer face sheet being locally thickened in the area of the core panel reduced thickness portion such that the composite panel thickness is constant thereacross, the core panel including a plurality of cells extending between the inner and outer face sheets, the cells within the reduced thickness portion being substantially filled with a filler material, the cells within the ramp portion and constant thickness portion being substantially filled with aerogel;
   a primary splice plate extending across the reduced thickness portions;
   a vertical web disposed adjacent the reduced thickness portion and extending laterally inwardly away from the inner face sheet;
   a plurality of mechanical fasteners extending along each side of the vertical web, each fastener having a shank extending through the outer face sheet, the reduced thickness portion, the inner face sheet and the primary splice plate, the shank being directly mounted within the core panel; and
   a layer of thermal barrier compound covering the primary splice plate.

2. The composite structure of claim 1 wherein:
   the vertical web having opposing web faces;
   the layer of thermal barrier compound extends along the opposing web faces.

3. The composite structure of claim 1 wherein:
   each one the mechanical fasteners terminates in a fastener receiver disposed against the primary splice plate;
   the layer of thermal barrier compound covering the fastener receivers.

4. The composite structure of claim 1 wherein the filler material is one of aerogel and thermal barrier compound and potting compound.

5. The composite structure of claim 4 wherein:
   the aerogel is a silica aerogel;
   the thermal barrier compound is a silicone-based elastomer; and
   the potting compound is an epoxy/microballoon material.

6. The composite structure of claim 1 wherein:
   the core panel is formed of honeycomb;
   each one of the cells being configured as an elongate hollow cell having a hexagonal cross section and being oriented generally orthogonally relative to the inner and outer face sheets.

7. The composite structure of claim 6 wherein the honeycomb is formed of aramid paper.

8. The composite structure of claim 1 wherein the inner and outer face sheets are formed of graphite/epoxy material.

9. The composite structure of claim 1 wherein the thermal barrier compound layer is formed at a constant thickness above a level of the fastener receivers.

10. A composite joint, comprising:
    a pair of adjoining composite panels each defining a composite panel thickness and having at least one of an inner and outer face sheet saudwiching a core panel therebetween, the core panel defining a generally constant thickness portion and a ramp portion along which the core panel tapers to a reduced thickness portion, the composite panels being arranged such that the reduced thickness portions are adjacent to one another, the outer face sheet being locally thickened in the area of the core panel reduced thickness portion such that the composite panel thickness is constant thereacross, the core panel including a plurality of cells extending between the inner and outer face sheets, the cells within the reduced thickness portions being substantially filled with a filler material, the cells within the ramp portions and constant thickness portions being substantially filled with aerogel;
    a primary splice plate extending across the reduced thickness portions of the adjoining composite panels;
    at least one mechanical fastener extending through the outer face sheet, the reduced thickness portions and the inner face sheet of each one of the composite panels and passing through the primary splice plate; and
    a layer of themal barrier compound covering the primary splice plate.

11. The composite joint of claim 10 further comprising:
at least one secondary splice plates sized and configured to be complementary to the primary splice plate;
wherein:
the primary splice plate is sandwiched between the outer face sheets and the secondary splice plate;
the mechanical fastener extending through the outer face sheet, the reduced thickness portions and the inner face sheet of each one of the composite panels and passing through the primary and secondary splice plates.

12. The composite joint of claim 10 wherein the filler material is one of aerogel and thermal barrier compound and potting compound.

13. The composite structure of claim 12 wherein:
the aerogel is a silica aerogel;
the thermal barrier compound is a silicone-based elastomer; and
the potting compound is an epoxy/microballoon material.

14. The composite joint of claim 10 wherein each one of the adjoining composite panels the mechanical fasteners are arranged in two rows in each of the composite panels.

15. The composite joint of claim 10 wherein:
each one the mechanical fasteners terminates in a fastener receiver disposed against the secondary splice plate;
the layer of themal barrier compound covering the fastener receivers.

16. The composite joint of claim 10 wherein:
the core panel is formed of honeycomb;
each one of the cells being configured as an elongate hollow cell having a hexagonal cross section and being oriented generally orthogonally relative to the inner and outer face sheets.

17. The composite joint of claim 16 wherein the honeycomb is formed of aramid paper.

18. The composite joint of claim 10 wherein the inner and outer face sheets are formed of graphite/epoxy material.

19. The composite joint of claim 10 wherein the thermal barrier compound layer is formed at a constant thickness above a level of the fastener receivers.

20. The composite joint of claim 10 further comprising:
a vertical web extending laterally inwardly from the inner face sheets of the adjoining composite panels, the vertical web having opposing web faces;
wherein the layer of themal barrier compound extends along the opposing web faces.

* * * * *